United States Patent [19]

Briggs et al.

[11] Patent Number: 5,717,802
[45] Date of Patent: Feb. 10, 1998

[54] FIBER OPTIC CONNECTORS HAVING SPRING-LOADED FERRULES

[75] Inventors: Robert Carl Briggs, Newport; Thomas Ralph Fawcett, Jr., Harrisburg; Randy Marshall Manning, New Cumberland, all of Pa.

[73] Assignee: The Whitaker Corporation, Wilmington, Del.

[21] Appl. No.: 308,314

[22] Filed: Sep. 19, 1994

[51] Int. Cl.⁶ .................................................. G02B 6/38
[52] U.S. Cl. ................... 385/75; 385/78; 385/60; 385/72; 385/76
[58] Field of Search ......................... 385/75, 60, 53, 385/72, 78, 81, 86

[56] References Cited

U.S. PATENT DOCUMENTS

| 4,477,146 | 10/1984 | Bowen et al. | 385/81 |
|---|---|---|---|
| 4,726,647 | 2/1988 | Kakii et al. | 350/96.21 |
| 4,747,658 | 5/1988 | Borsuk et al. | 350/96.2 |
| 4,804,243 | 2/1989 | Borsuk et al. | 350/96.2 |
| 4,834,487 | 5/1989 | Abendschein et al. | 385/75 |
| 4,969,924 | 11/1990 | Suverison et al. | 350/96.2 |
| 5,212,752 | 5/1993 | Stephenson et al. | 385/78 |
| 5,228,104 | 7/1993 | Desmons | 385/72 |
| 5,253,315 | 10/1993 | Fentress | 385/78 |
| 5,265,183 | 11/1993 | Feng et al. | 385/78 |
| 5,285,510 | 2/1994 | Slaney | 385/78 |
| 5,287,425 | 2/1994 | Chang | 385/81 |
| 5,313,540 | 5/1994 | Ueda et al. | 385/78 |
| 5,363,459 | 11/1994 | Hultermans | 385/86 X |
| 5,394,497 | 2/1995 | Erdman et al. | 385/72 X |
| 5,436,995 | 7/1995 | Yoshizawa et al. | 385/86 |

*Primary Examiner*—Phan T. H. Palmer

[57] ABSTRACT

Optical fiber connector assemblies. The connectors comprise plug bodies having two cantilevered beams disposed in a rear interior portion of the plug body and a ferrule which houses an optical fiber that is front-loaded into the plug body and which is adapted to bias the two cantilevered beams when placed in the plug body such that the plug body snaps around the plug member to captivate the ferrule member in the optical fiber connector. The connector is further comprised of a spring placed axially in the plug body for spring-loading the ferrule member in the plug body, and a rear housing adapted to receive the rear portion of the ferrule member when the ferrule member is placed in the plug body. The optical fiber connectors which are described herein ensure precise optical alignment of optical waveguides in the connector and are simple to assemble.

6 Claims, 5 Drawing Sheets

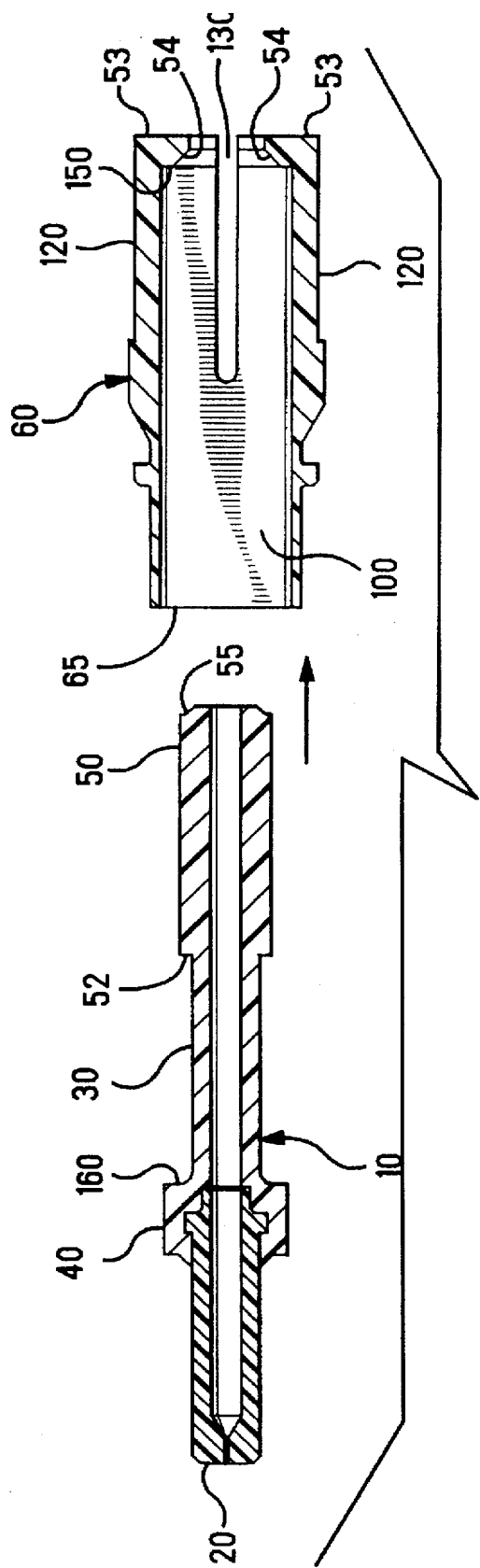
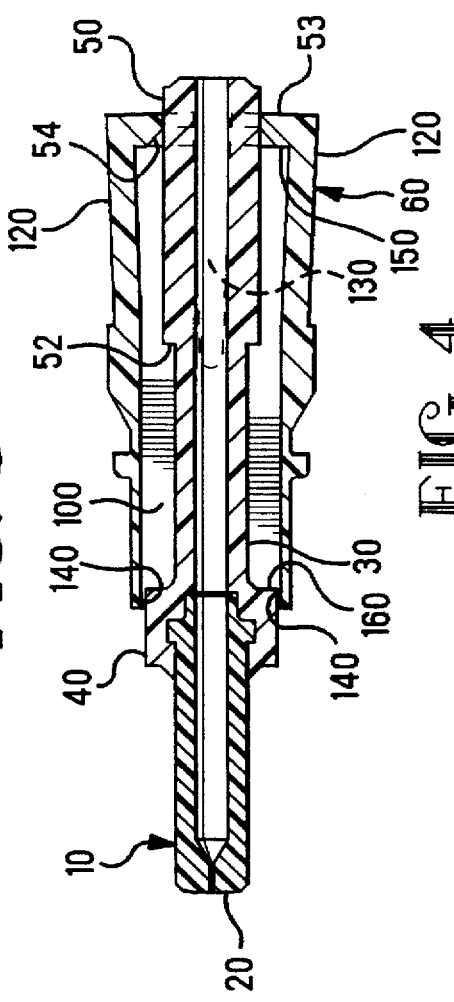
FIG. 3
FIG. 4

FIBER OPTIC CONNECTORS HAVING SPRING-LOADED FERRULES

FIELD OF THE INVENTION

This invention relates generally to fiber optic connectors. More specifically, this invention relates to spring-loaded fiber optic connectors.

BACKGROUND OF THE INVENTION

Fiber optic connectors are known in the art and include ferrules which have optical fibers or waveguides that carry data signals through the connectors to other similar connectors or devices containing optical elements. One particular-type of fiber optic connector is called an SC connector. In general, the ferrule assembly in an SC connector is disposed in a plug frame such that an end portion of the ferrule projects from one end of the plug frame. Typically, strength members are disposed over a cable retention member projecting from another end of the connector. See for example, U.S. Pat. No. 5,212,752, Stephenson et al., the teachings of which are specifically incorporated herein by reference.

SC connectors such as those shown in the Stephenson et al. patent are provided with a plurality of grips and a coupler housing which cause the ends of two ferrules in separate housings to be placed in precise optical alignment with each other. This allows the individual fibers, or a fiber in the connector and another optical element, to be optically aligned so that accurate data transmission of signals through the connector is achieved. The ferrules found in the connectors of the Stephenson et al. patent are loaded through a rear portion of a connector housing and captivated by a cable retention member. This arrangement adds an assembly step during the manufacturing process.

Other arrangements allow ferrules to be captivated in connectors when the ferrules are "front-loaded" by providing a C-ring on the exterior of the ferrule, which mates with a groove in a longitudinal interior passage of a connector housing. See, e.g., U.S. Pat. No. 5,265,183, Feng et al., col 4, line 54 through column 5, line 3, the teachings of which are specifically incorporated herein by reference. However, the addition of the C-ring and groove also complicates the manufacturing process by adding other steps thereto, and by requiring additional elements in the connectors which must be mechanically interfaced together. Thus, prior connectors having both front-loaded and rear loaded ferrules fail to solve a long-felt need in the art for connectors that are easily manufactured at low cost.

The assignee of the present invention has recognized that it is beneficial to employ SC connectors which are easily assembled while ensuring accurate and precise fiber optic waveguide alignment. Ease of assembly should be achieved without sacrificing the basic function of the connectors. Furthermore, the connectors should advantageously employ a short and efficient manufacturing process which requires only a minimum amount of mechanical parts and interfaces. These needs have not heretofore been achieved in the art.

SUMMARY OF THE INVENTION

The aforementioned problems are solved and long-felt needs fulfilled by optical fiber connectors provided in accordance with the present invention. In a preferred embodiment, such optical fiber connectors comprise a plug body having at least one cantilevered beam disposed in a rear, interior portion of the plug body and a front opening in the plug body. More preferably, a ferrule member front-loaded into the plug body is provided which houses an optical fiber, the ferrule member being adapted to bias at least one cantilevered beam when placed in the plug body such that the plug body snaps around the ferrule member and the ferrule member is captivated by the plug body.

In a preferred aspect of the invention, a spring is provided placed axially in the plug body for spring-loading the ferrule member in the plug body. Even more preferably, the ferrule member comprises a rear cylindrical portion of a first diameter and a middle portion having a second diameter, and a front portion from which an optical fiber can be interfaced with another optical element. It is preferred that the second diameter be smaller than the first diameter, and that the ferrule member further comprise an antirotational collar which is adapted to prevent rotational motion of the ferrule member within the plug body.

In even more preferred aspects, an optical fiber connector provided in accordance with the present invention further comprises a plug body having a shoulder that provides a surface on which the spring is seated to resiliently bias the ferrule member. It is preferred that the antirotational collar provide a reaction face for the spring, thereby causing the ferrule member to be spring-loaded within the plug body.

The invention will be best understood by reading the following detailed description in conjunction with the drawings which are first described briefly below.

BRIEF DESCRIPTION OF THE DRAWINGS

FIG. 3 is a cross-sectional view of the fiber optic connector of FIG. 2 prior to assembly, shown without a spring for purposes of clarity.

FIG. 4 is a view of the fiber optic subassembly of FIG. 2 during assembly, shown without the spring for purposes of clarity.

DETAILED DESCRIPTION OF PREFERRED EMBODIMENTS

Figure 1:
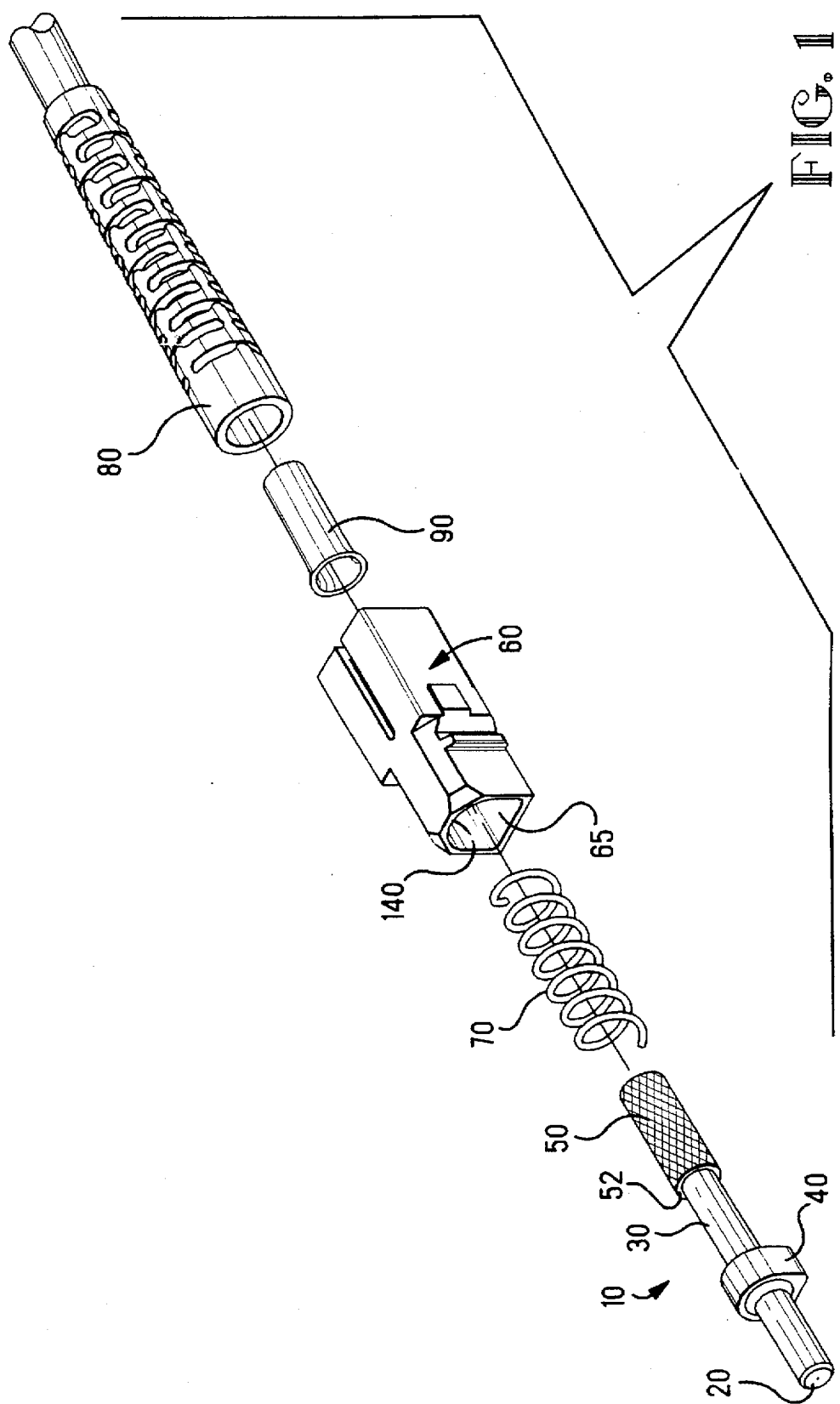
FIG. 1 is an exploded isometric view of an optical fiber connector provided in accordance with the present invention.

Referring now to the drawings wherein like reference numerals refer to like elements a connector in accordance with the present invention is shown in FIG. 1. Preferably, this is an SC connector, but it will be recognized by those with skill in the art that other kinds of connectors may employ the present invention. For convenience throughout, the term "connector" as used herein means an SC connector.

The connector of FIG. 1 comprises a ferrule member shown generally at 10 which preferably houses an optical fiber that will extend to the front end 20 of the ferrule member 10 and which will carry signals through the connector of FIG. 1 to other waveguides or optical elements. The ferrule further comprises a substantially cylindrical middle section 30 on which is formed an anti-rotational collar 40 that resists rotation of the ferrule when it is installed in the connector. On a rear end of the ferrule, an integrally formed retention shoulder 52 is provided which acts to secure the ferrule in the connector as will be described further below.

In accordance with the invention, a novel plug body 60 is provided which is adapted to house the ferrule 10. As can be seen, the plug body has a square profile on one half and a rounded profile on the other half. The plug body has an opening 65 in the front end through which ferrule member 10 is placed so that the plug body 60 can be loaded to form the connector of the present invention. Front-loading the ferrule member in this fashion reduces the manufacturing time for connectors and eliminates the need for C-ring members to be placed in the posterior of the plug body to secure the ferrule member therein. Plug body 60 and the various components which form the connector of FIG. 1 can be injection molded out of appropriate polymeric material, preferably polyester.

The plug body 60 is also adapted to house a resilient spring member shown at 70. The spring member 70 has a radius and an axial length such that the ferrule 10 can be placed within the radius along a longitudinal axis of the spring member. The entire assembly can then be front-loaded within the interior of plug body 60 through the front opening 65. A cable bend relief member 80 interfaces with the rear end of the subassembly (not shown) which houses the rear end of the optical fiber. The cable bend relief member 80 is of a standard construction known to those with skill in the art and is provided to ensure that the optical fiber maintains a minimum bend radius. It is preferable to include a crimp eyelet 90 which will interface with the cable relief member 80. As is known to those with skill in the art, the interface of crimp eyelet 90 with strength members found in the cable provides strain relief for the connector.

Figure 2:
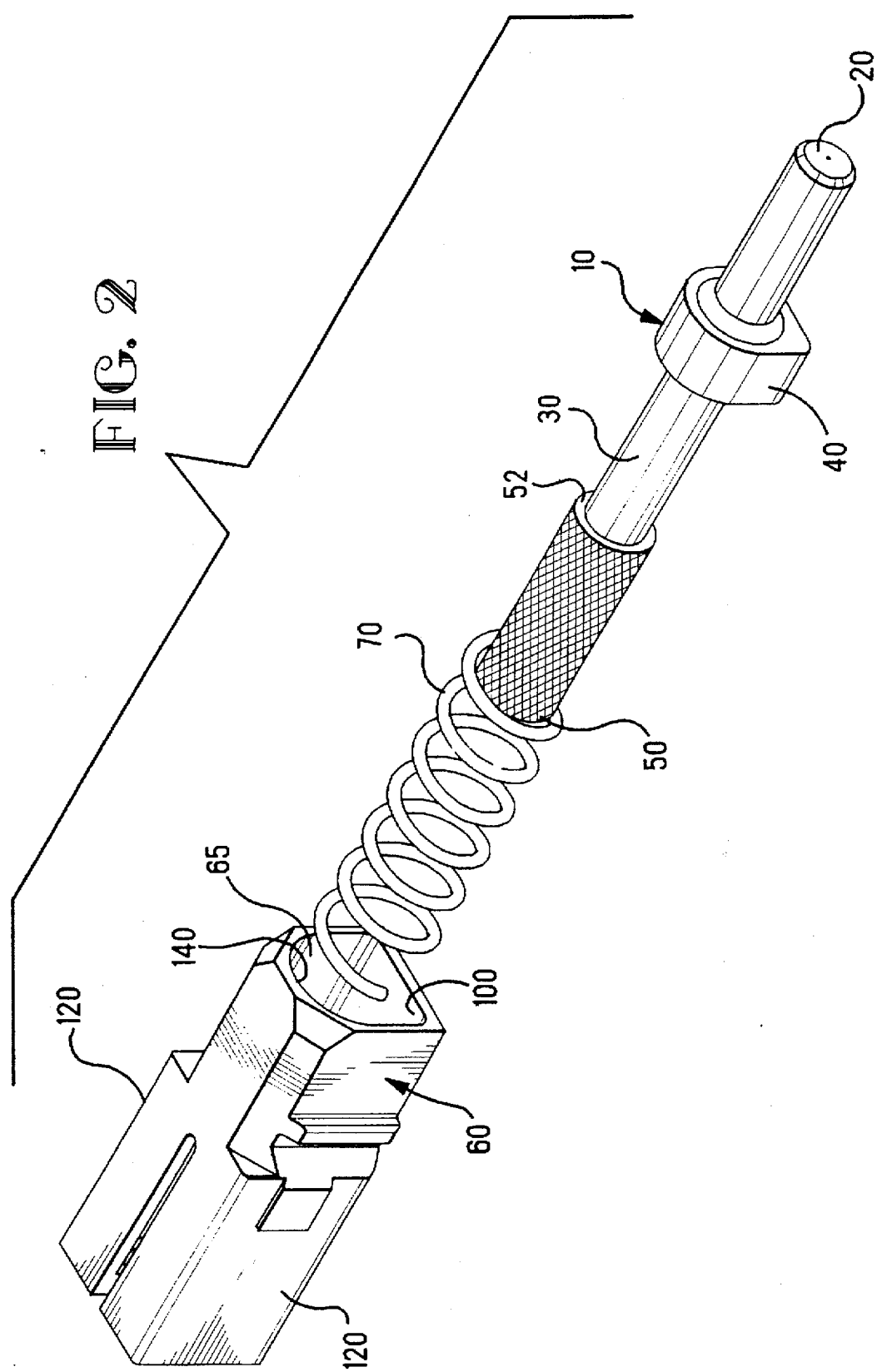
FIG. 2 is an exploded view of an optical fiber connector subassembly provided in accordance with the present invention.

Referring now to FIG. 2, the subassembly comprising ferrule 10, plug body 60, and spring 70 is shown prior to assembly. Spring 70 surrounds ferrule member 10 as the ferrule member is placed through the inside diameter of the spring. Subsequent to assembly, the ferrule member 10 and spring 70 are captivated within the interior 100 of plug body 60. The antirotational collar 40 interfaces with the front portion of spring 70 and the rear end 50 of the ferrule 10 protrudes past the back portion of spring 70 and out the back of plug body 60. A retention shoulder 52 engages an outer rim 53 on the plug body 60 to retain the ferrule 10 there-within. The rear portion of spring 70 engages an inner shoulder 150 of the plug body 60. In this fashion, the spring is compressed between the inner shoulder 150 and the antirotational collar 40. The ferrule 10 is spring-loaded in the plug body 60 and ultimately in the entire optical connector, thereby causing ferrule 10 to be engageable with either another connector having a similar ferrule member or another optical element. This causes the individual waveguides to be optically aligned so that signals will be carried through connectors provided in accordance with the present invention in a reliable manner. The rear end 50 of ferrule 10 may also be placed in frictional engagement with crimp eyelet 90 and the strength members.

In a preferred embodiment, the plug body 60 is provided with two cantilevered elements or beams shown externally at 120 which will be urged outwardly as the rear end 50 of ferrule 10 is front-loaded through opening 65 into the interior 100 of plug body 60. A bevel 55 is on an edge of rear portion 50. A taper 54 is on the interior 100 of the plug body 60 and opposite the rim 53. As the ferrule ingresses into the interior 100, bevel 55 engages taper 54. Further ingress of ferrule 10 causes the taper 54 to act as a camming surface to urge the cantilevered beams 120 outwardly. As bevel 55 of ferrule 10 spreads the cantilevered beams 120 apart, the rear half of the plug body expands. The expansion permits the rear portion 50 to move past rim 53. A diameter reduction between rear portion 50 and middle portion 30 of ferrule 10 at retention shoulder 52 permits cantilevered beams 120 to snap down around the middle portion 30 on the ferrule member 10. Retention shoulder 52 engages rim 53 thereby restraining ferrule 10 within interior 100 against forces exerted by the compressed spring 70. In this manner, the ferrule 10 is spring loaded and captivated within the subassembly.

FIGS. 3 and 4 illustrate the front-loading assembly operation of ferrules in optical connectors provided in accordance with the present invention. FIGS. 3 and 4 are shown without a spring for purposes of clarity. As shown in FIG. 3, the cantilevered beams 120 are formed by splitting the rear half of plug body 60 with a substantially U-shaped cut or groove 130 formed from an exterior of the plug body 60 through to the interior 100 of the plug body. Since the plug body is preferably constructed of a substantially resilient polymeric material or other material which will exhibit mechanical resiliency under stress, the rear end 50 of ferrule 10 will adequately bias the cantilevered beams 120 as the ferrule 10 is front-loaded through opening 65 and passed through the back portion of the plug body 60 without the plug body material going plastic.

FIG. 4 shows cantilevered beams 120 flared outwardly after they have been biased by bevel 55 permitting ferrule 10 to pass through the back portion of plug body 60. Antirotational collar 40 has a substantially D-shaped circumference. Subsequent to assembly, the antirotational collar 40 fits within a correspondingly shaped antirotation profile 140. The antirotation profile 140 is sized to receive antirotation collar 40 and is appropriately toleranced to minimize radial movement of the ferrule 10 relative to the plug body 60.

Figure 5:
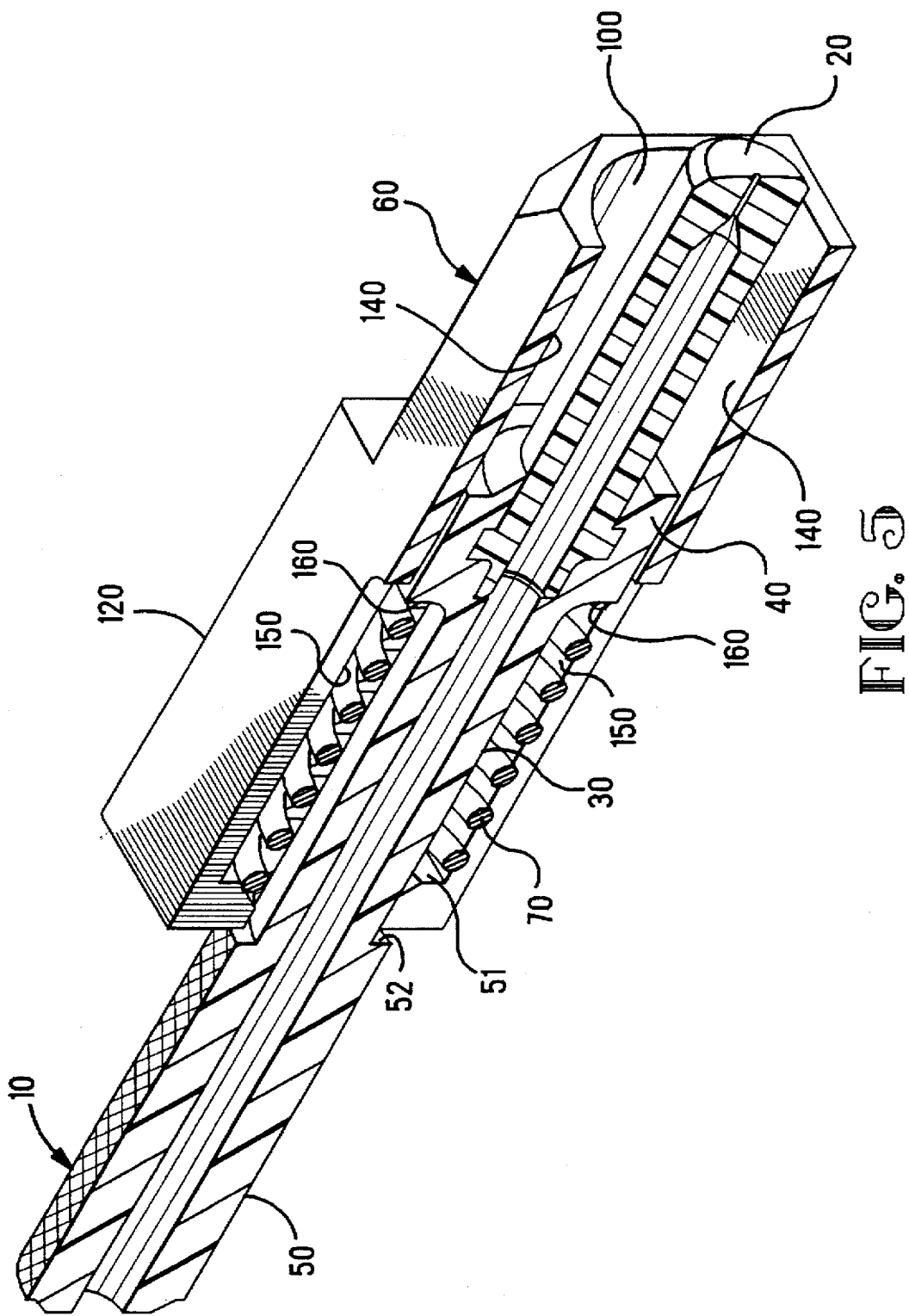
FIG. 5 is an isometric, cross-sectional view of a plug body provided in accordance with the present invention.

The cross-sectional, isometric view of FIG. 5 illustrates how spring member 70 acts to spring-load ferrule 10 in accordance with the present invention after the ferrule is front-loaded in the plug body. Spring member 70 is seated against the inner shoulder 150 in the interior 100 of plug body 60. A transverse reaction face 160 on antirotational collar 40 engages spring member 70 to bias the ferrule 10 forwardly of the connector. Spring member 70 allows the ferrule 10 to be mated with some other device or connector such that when the ferrule or other device is engaged with the front portion 20 of ferrule member 10, the ferrule slightly retracts under the resilient force of spring member 70, thereby providing positive mating of the optical waveguides within the connector and a mating connector or optical element.

Front-loading the ferrule member 10 through front opening 65 of plug body 60 in this fashion reduces the manufacturing process time for connectors provided in accordance with the present invention. By the simple front-loading design of the optical connectors described herein, it is not necessary to use two piece plug bodies or peripheral ferrule securing devices such as C-rings to captivate the ferrule in the connector.

Figure 6:
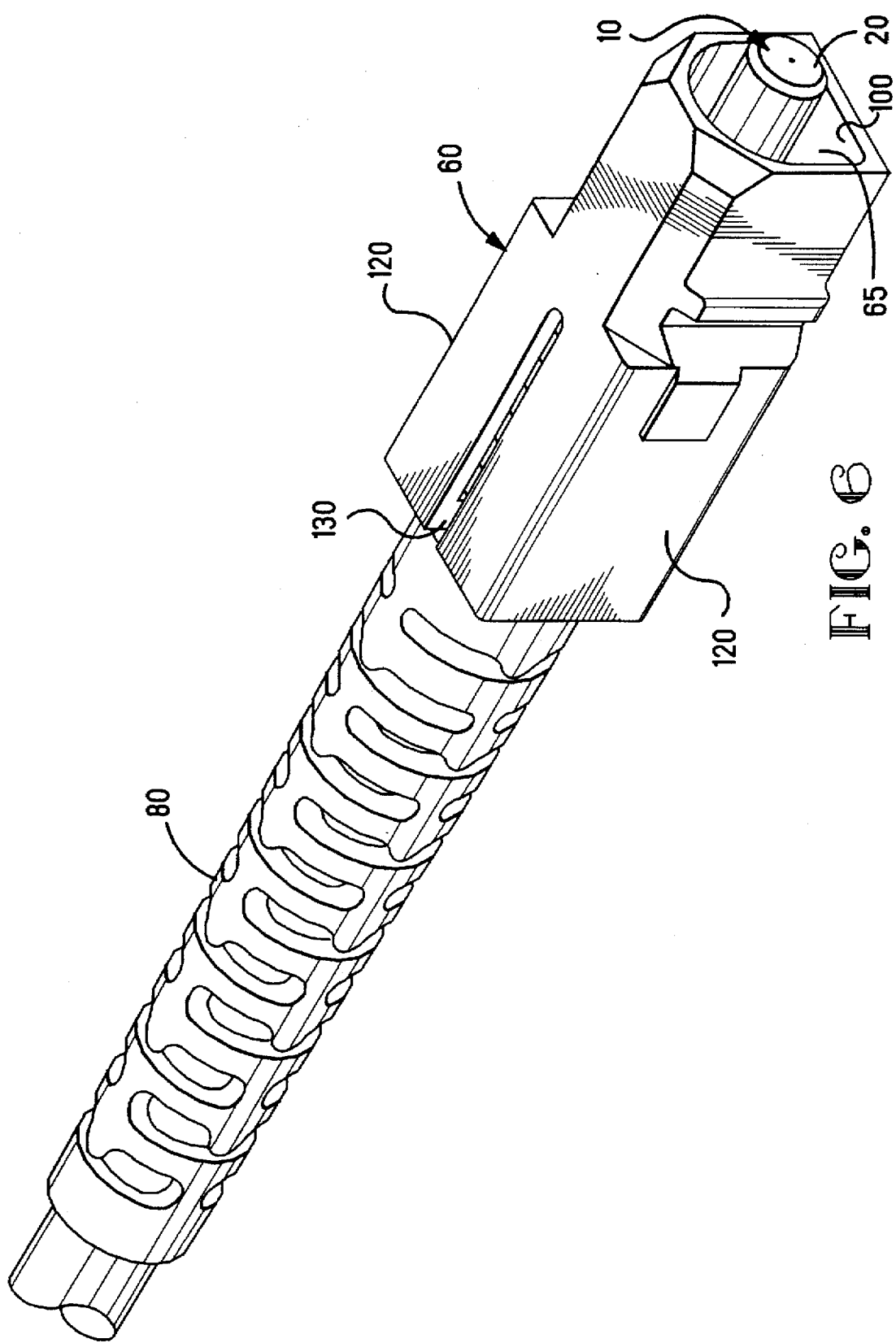
FIG. 6 is an isometric view of the mated fiber optic subassembly provided in accordance with the present invention.

Referring now to FIG. 6, the subassembly comprising the ferrule 10 and plug body 60 is assembled with the crimp eyelet 90 and strain relief member 80 to form an SC connector of the present invention. Ferrule 10 is securely snap-fitted in the plug body 60 by cantilevered beams 120 and captivated in the plug body. Furthermore, ferrule 10 is spring-loaded, thereby allowing a simple, efficient and precise interface between the connector shown in FIG. 6 and any other optical element which is adapted to receive signals transmitted through the connector. The cantilevered beams 120 and spring-loaded ferrule allow the connectors provided in accordance with the present invention to be easily assembled and maintained. Thus, the optical fiber connectors disclosed and claimed herein are simple to operate, and ensure precise optical alignment of the optical fiber elements disposed therein. Furthermore, these connectors can be manufactured at very low cost due to their simple design. Such results have not heretofore been achieved in the art.

There have thus been described certain preferred embodiments of optical fiber connectors provided in accordance with the present invention. While preferred embodiments have been described and disclosed, it will be recognized by those with skill in the art that modifications are within the true spirit and scope of the invention. The appended claims are intended to cover all such modifications.

What is claimed is:

1. A fiber optic connector subassembly comprising:

a fiber optic ferrule having a transverse reaction face;

a spring engaging said reaction face; and a plug body adapted to receive said fiber optic ferrule through a front end of said plug body, said plug body having a plurality of cantilevered beam members, whereby when said fiber optic ferrule is assembled to said plug body said cantilevered members are urged outwardly by said fiber optic ferrule and retract to captivate said fiber optic ferrule therewithin wherein said cantilevered beams are formed by a plurality of substantially U shaped grooves in said plug body.

2. A fiber optic connector subassembly comprising: a plug body having an antirotation internal profile, a front opening and at least one cantilevered beam disposed in a rear portion of the plug body;

a ferrule member having an antirotation collar, said ferrule member front-loaded into the plug body, said ferrule member adapted to urge said at least one cantilevered beam outwardly when placed in the plug body such that upon assembly the plug body snaps around the ferrule member and the ferrule member is captivated therein, said antirotation collar being received within the antirotation internal profile, and a spring disposed between the plug body and the ferrule member.

3. The fiber optic connector subassembly recited in claim 2 wherein said ferrule member comprises a rear cylindrical portion of a first diameter and a middle portion having a second diameter, wherein said second diameter is smaller than said first diameter.

4. The fiber optic connector subassembly as recited in claim 2 wherein said antirotation collar on said ferrule further comprises a transverse reaction face engaging said spring.

5. The fiber optic connector subassembly as recited in claim 2 wherein said ferrule further comprises a retention shoulder.

6. The fiber optic connector subassembly recited in claim 2 wherein, said plug body further comprises an inner shoulder and the spring is compressed between said ferrule and said inner shoulder.

* * * * *